(12) United States Patent
Cahill

(10) Patent No.: US 9,207,136 B2
(45) Date of Patent: Dec. 8, 2015

(54) BRAKE MANUFACTURER IDENTIFICATION SYSTEM AND METHOD

(71) Applicant: Goodrich Corporation, Charlotte, NC (US)

(72) Inventor: Eric Daniel Cahill, Troy, OH (US)

(73) Assignee: GOODRICH CORPORATION, Charlotte, NC (US)

(*) Notice: Subject to any disclaimer, the term of this patent is extended or adjusted under 35 U.S.C. 154(b) by 174 days.

(21) Appl. No.: 14/075,744

(22) Filed: Nov. 8, 2013

(65) Prior Publication Data

US 2015/0128689 A1    May 14, 2015

(51) Int. Cl.
*B60Q 1/00* (2006.01)
*G01L 5/28* (2006.01)
*B60T 17/22* (2006.01)
*G01K 3/00* (2006.01)
*G06Q 10/08* (2012.01)
*F16D 66/00* (2006.01)

(52) U.S. Cl.
CPC . *G01L 5/28* (2013.01); *B60T 17/22* (2013.01); *G01K 3/00* (2013.01); *G06Q 10/0875* (2013.01); *F16D 2066/001* (2013.01)

(58) Field of Classification Search
CPC ....... B60T 8/00; B60T 13/746; B60T 8/1703; B60T 17/18; B60T 17/22; B60T 17/221; B60T 7/12; B60T 8/172; B60T 8/267; B60T 8/885; B60L 11/1851; B60L 11/1861; B64C 25/42; B64C 25/426; B64C 25/44; G01L 5/25; G01K 3/00; G06Q 10/0875
USPC .......................................................... 340/453
See application file for complete search history.

(56) References Cited

U.S. PATENT DOCUMENTS

| | | | |
|---|---|---|---|
| 5,637,794 A | 6/1997 | Hanisko | |
| 5,787,443 A * | 7/1998 | Palmer | 1/1 |
| 6,837,553 B2 * | 1/2005 | Beck et al. | 303/191 |
| 2002/0069137 A1 * | 6/2002 | Hiroshige et al. | 705/27 |
| 2006/0186736 A1 * | 8/2006 | DeVlieg et al. | 303/126 |
| 2006/0273658 A1 * | 12/2006 | Halassy-Wimmer et al. | 303/191 |
| 2007/0175713 A1 * | 8/2007 | DeVlieg et al. | 188/158 |
| 2011/0208381 A1 * | 8/2011 | Le Brusq et al. | 701/22 |
| 2014/0229042 A1 * | 8/2014 | Elstorpff et al. | 701/19 |
| 2014/0292072 A1 * | 10/2014 | Nakanishi et al. | 307/9.1 |

FOREIGN PATENT DOCUMENTS

GB     2171525     8/1986

OTHER PUBLICATIONS

Extended European Search Report dated Apr. 23, 2015 in European Application No. 14191535.5.

* cited by examiner

*Primary Examiner* — Kerri McNally
(74) *Attorney, Agent, or Firm* — Snell & Wilmer L.L.P.

(57) ABSTRACT

Systems and methods for identification of brake suppliers and vehicle models based on electrical resistance of the brake control unit are disclosed herein. Based on calculated values, both the brake supplier and model of vehicle can be determined.

15 Claims, 5 Drawing Sheets

BRAKE MANUFACTURER IDENTIFICATION SYSTEM AND METHOD

FIELD

The present disclosure relates to the identification of, and more particularly, to a system for the identification of brake manufacturers for aircraft.

BACKGROUND

Aircraft are typically equipped with wheels and brakes in order travel over land. Brakes are sometimes furnished by manufacturers for specific models and series of various vehicles. For example, with aircraft, brake manufacturers may vary across series of the same aircraft or even within a series of the same aircraft. For example, an aircraft series may be available with a choice of brake systems from two different manufacturers. While choice may be beneficial to the aircraft purchaser, it may be difficult for the brake control system to know the type of brake being controlled. Improper identification by a brake control system may degrade brake system performance and compromise safety.

SUMMARY

Methods are disclosed comprising applying, by a brake control unit ("BCU"), a test voltage to a connector of a brake temperature monitoring system ("BTMS"), measuring, by the BCU, an observed voltage across the connector, and determining, by the BCU, an identity of a first brake manufacturer information associated with the BTMS based upon the observed voltage.

The systems comprise a BCU configured to be in electrical communication with a connector of a BTMS, wherein the BCU is configured to apply a test voltage to the connector, wherein the BCU is configured to measure an observed voltage across the connector, wherein the BCU is configured to determine an identity of a first brake manufacturer information associated with the BTMS based upon the observed voltage.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
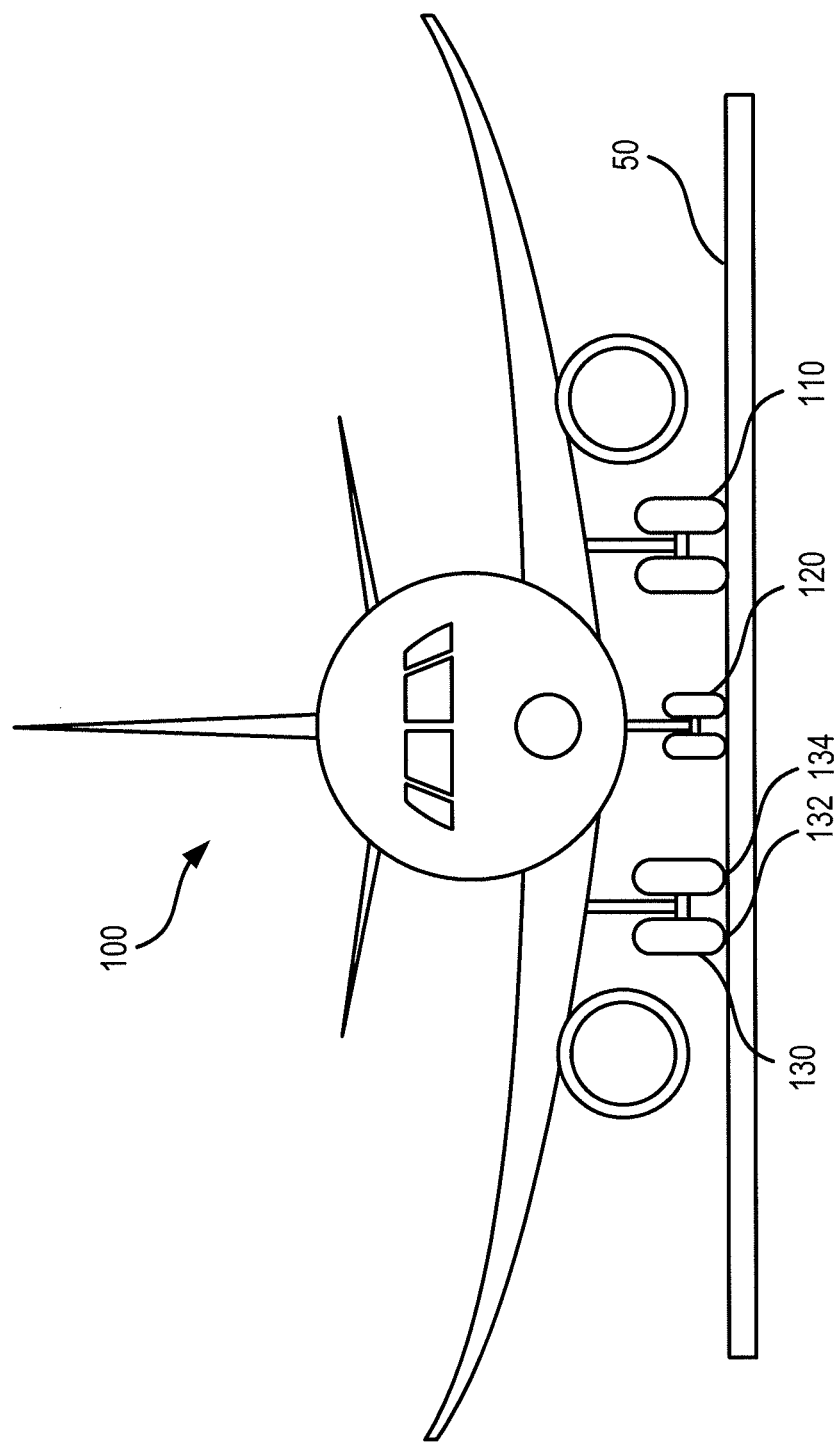
FIG. 1 illustrates, in accordance with various embodiments, a front view of an aircraft on the ground.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

An aircraft braking system may comprise one or more brake pedals, one or more brake control units (individually, a "BCU") that receives input from the one or more brake pedals, and downstream components that receive commands from the BCU, either directly or indirectly, to effect and control braking. For example, in various embodiments, brake pedals within the cockpit of an aircraft may be depressed to indicate a desired amount of braking. In response to an input brake command, the BCU may derive an output command in the form of a brake control signal or multiple brake control signals. Collectively, the brake control signals are intended to command downstream components to effectuate the desired amount of braking in relation to the input brake command. Where deceleration and/or antiskid control occurs, data from sensors associated with downstream components of the aircraft braking system may be used to control the desired amount of braking in conjunction with the input brake command.

BTMSs may be in electrical communication with a BCU via, among other things, a connector. For example, a commonly supported connector type may include a composite connector that meets the requirements of Mil-STD-38999 and such a connector may be referred to as a Mil-C-38999 connector. Connectors of various BTMSs may be solder-pin style connectors or crimp style connectors and may provide an electrical connection between the BTMS and the BCU. For example, in various embodiments, the BCU is connected to the BTMS via a connector. In various embodiments, the BCU is placed in electrical communication with a BTMS via connector and one or more other components such as various wiring, wiring harnesses, and other hardware. The connector in a BTMS can use various types of pins and have various arrangements of those pins. The types and arrangement of the pins in a connector is often manufacturer specific.

Over time, aircraft components are repaired, refurbished, and/or replaced. In that regard, the use of appropriate replacement parts and service prevent poor performance and degraded safety. For example, if an EBA is replaced with a new EBA, the other components of the aircraft braking system should be compatible with the new EBA. In various embodiments, a BCU may be configured to detect brake manufacturer information and a BCU may be configured to load control logic that is configured for a component that is not associated with the same brake manufacturer as the BCU.

In a BTMS, pin A may be an alloy comprising about 95% nickel, about 2% manganese, about 2% aluminum and about 1% silicon (e.g., available under the ALUMEL mark from Hoskins Manufacturing Company). ALUMEL may be used as half of a K type thermocouple in a BTMS. A BTMS may be configured to have pin C made from an alloy that contains about 90% nickel and about 10% chromium (e.g., available under the CHROMEL™ mark from Hoskins Manufacturing Company). CHROMEL may be used for another half of a K type thermocouple in a BTMS. However, various embodiments disclosed herein include other suitable alloys and are not particularly limited to the recited alloys. One or more pins may be non-conductive, or sent to ground, set to short circuit, connected to power, or shorted to one another.

With reference to FIG. 1, a front view of an aircraft 100 on ground 50 is illustrated according to various embodiments. Aircraft 100 may comprise landing gear including left main landing gear ("LMLG") 110, nose landing gear ("NLG") 120, and right main landing gear ("RMLG") 130. Though a t-gear type landing gear aircraft is depicted, it should be appreciated that the concepts described herein are applicable to aircraft having multiple axle pairs per gear and aircraft with more than two gears. Each gear may comprise two wheels. For example, RMLG 130 comprises right outboard wheel 132 and right inboard wheel 134. However, in various embodiments, aircraft 100 may comprise any number of landing gears and each landing gear may comprise any number of wheels. Additionally, the concepts disclosed herein variously apply to aircraft with other numbers of wheels (e.g. one wheel for each main landing gear).

Figure 2:
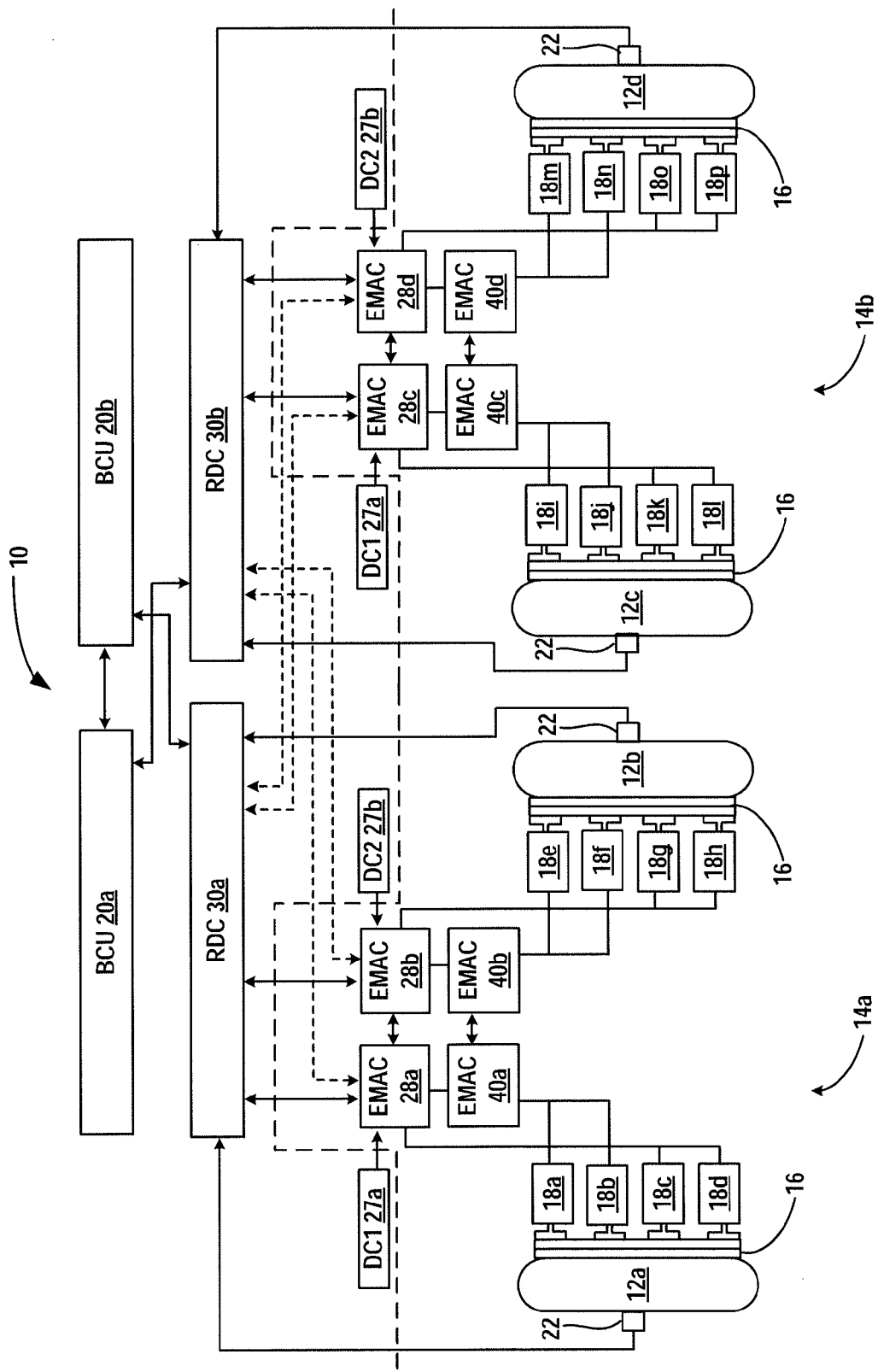
FIG. 2 illustrates an aircraft brake system, in accordance with various embodiments.

Referring to FIG. 2, aircraft braking system 10 is shown as providing braking with respect to four wheels 12a, 12b, 12c, 12d, of which two wheels 12a and 12b are mounted to a left landing gear truck 14a of an aircraft, and two wheels 12c and 12d are mounted to a right landing gear truck 14b of the aircraft. Each wheel 12a-12d has a brake stack assembly 16. Braking force may be applied to the brake stack assembly 16 using EBAs 18a, 18b, 18c, 18d, 18e, 18f, 18g, 18h, 18i, 18j, 18k, 18l, 18m, 18n, 18o, 18p. In the embodiment illustrated in FIG. 2, each wheel 12a-12d is associated with four EBAs. Further, a first wheel 12a is associated with EBAs 18a-18d, a second wheel 12b is associated with EBAs 18e-18h, a third wheel 12c is associated with EBAs 18i-18l, and a fourth wheel 12d is associated with EBAs 18m-18p.

It will be appreciated that various embodiments of disclosed braking systems may be extended to aircraft that include any number of wheels, any number of landing gear trucks, any number of axles per truck, and/or any number of EBAs.

Various embodiments of aircraft braking system 10 include an upper level controller, or brake control unit (BCU) 20a and 20b, for providing overall control of aircraft braking system 10. In the embodiment as illustrated in FIG. 2, two BCUs 20a, 20b are present so as to provide redundancy to aircraft braking system 10.

The EBAs may be controlled via one or more electromechanical actuator controllers ("EMACs"). The EMACs 28a, 28b, 28c, 28d and 40a, 40b, 40c, 40d, in various embodiments, receive power from a power bus. For example, two of the EMACs, such as a first EMAC 28a and a third EMAC 20c, may receive power from a first power bus 27a (for example, as referred to in FIG. 2 as DC1) of the aircraft to operate electronics in the respective EMACs and to supply actuation power to the EBAs. Similarly, the other two of the EMACs, such as a second EMAC 28b and a fourth EMAC 28d, may receive power from a second power bus 27b (for example, as referred to in FIG. 2 as DC2) of the aircraft to operate electronics in the respective EMACs and to supply actuation power to the EBAs.

In various embodiments, the brake control signals from the BCUs 20a-20b are directed to EMACs 28a-28d and 40a-40d through a network of the aircraft. Signals may be exchanged between the BCUs and the EMACs through remote data concentrators (RDCs) 30a, 30b. With continued reference to FIG. 2, two RDCs 30a and 30b are present so as to provide redundancy to the communications pathways. Primary communication links between the EMACs 28a-28d and 40a-40d and the RDCs 30a-30b are shown in solid lines in FIG. 2 and secondary (e.g., backup) communication links between the EMACs 28a-28d and 40a-40d and RDCs 30a-30b are shown in dotted lines in FIG. 2.

In accordance with various embodiments, the BCUs 20a, 20b may receive an input brake command indicative of a desired amount of braking. For example, brake pedals within the cockpit of the aircraft may be depressed to indicate a desired amount of braking, or an autobrake switch may generate the input brake command. The input brake command is then derived from the distance the brake pedals are depressed and/or from the autobrake selection. In response to the input brake command, the BCUs 20a, 20b derive an output command signal in the form of a brake control signal or multiple brake control signals. Collectively, the brake control signals are intended to effectuate the desired amount of braking in relation to the input brake command. BTMS 22 may monitor brake temperature and be in electrical communication with BCUs 20a, 20b.

Figure 3:
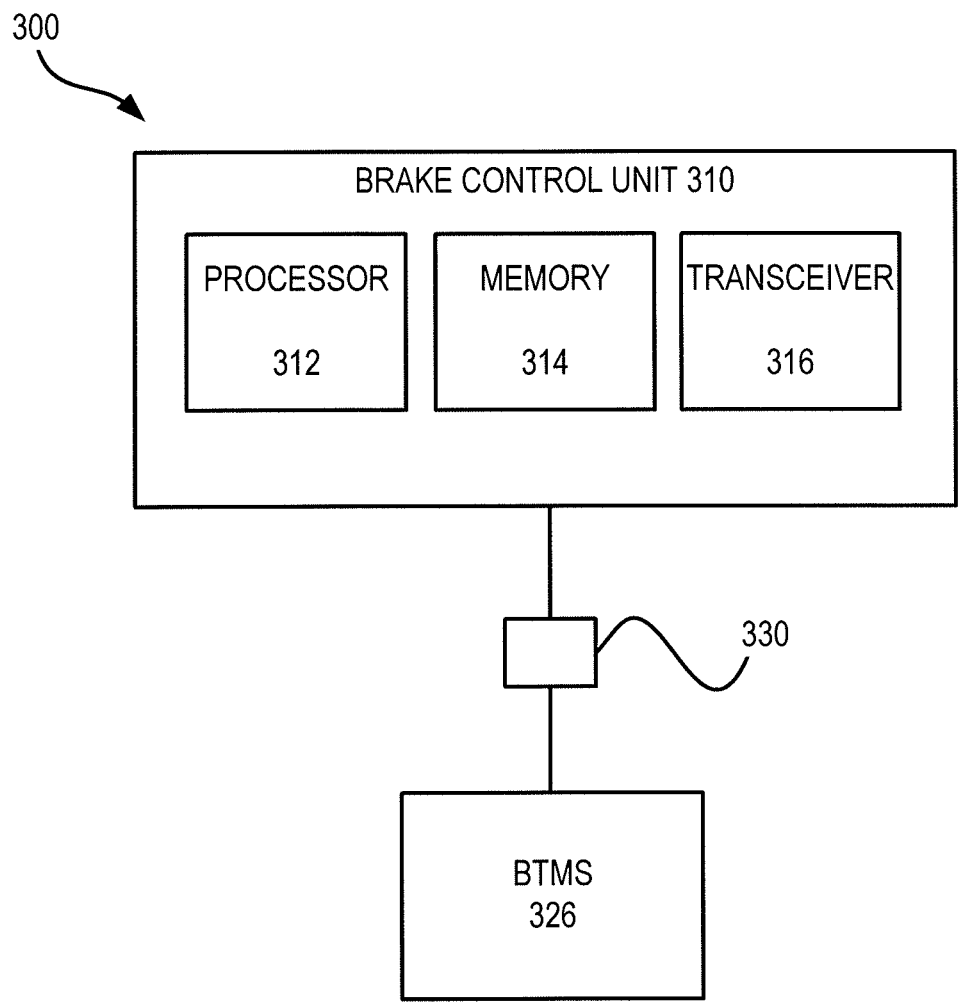
FIG. 3A illustrates a brake control unit, in accordance with various embodiments.
FIG. 3B illustrates a connector having pins, in accordance with various embodiments.
Figure 3:
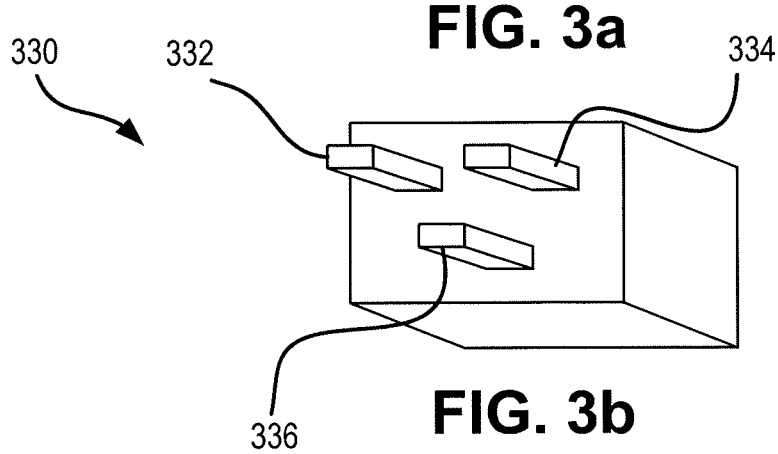

Referring to FIG. 3A, a system 300 is illustrated according to various embodiments. System 300 may comprise a brake control unit (BCU) 310. BCU 310 may be communicatively connected to BTMS 326 through connectors 330.

Referring to FIG. 3B, an exemplary connector 330 according to various embodiments is shown. In various embodiments, connector 330 may have a plurality of pins 332, 334, 336. According to various methods disclosed herein, by connecting and powering pin 332 and grounding pin 336, connector 330 may be used to identify brake manufacturer information, such as the brake part number, the identity of the manufacturer, revision, and/or other details regarding the brake. In various embodiments, the brake manufacturer information may be use, for example, in conjunction with a lookup table or other data structure that associates electrical properties of pins of a connector with brake manufacturers.

Figure 4:
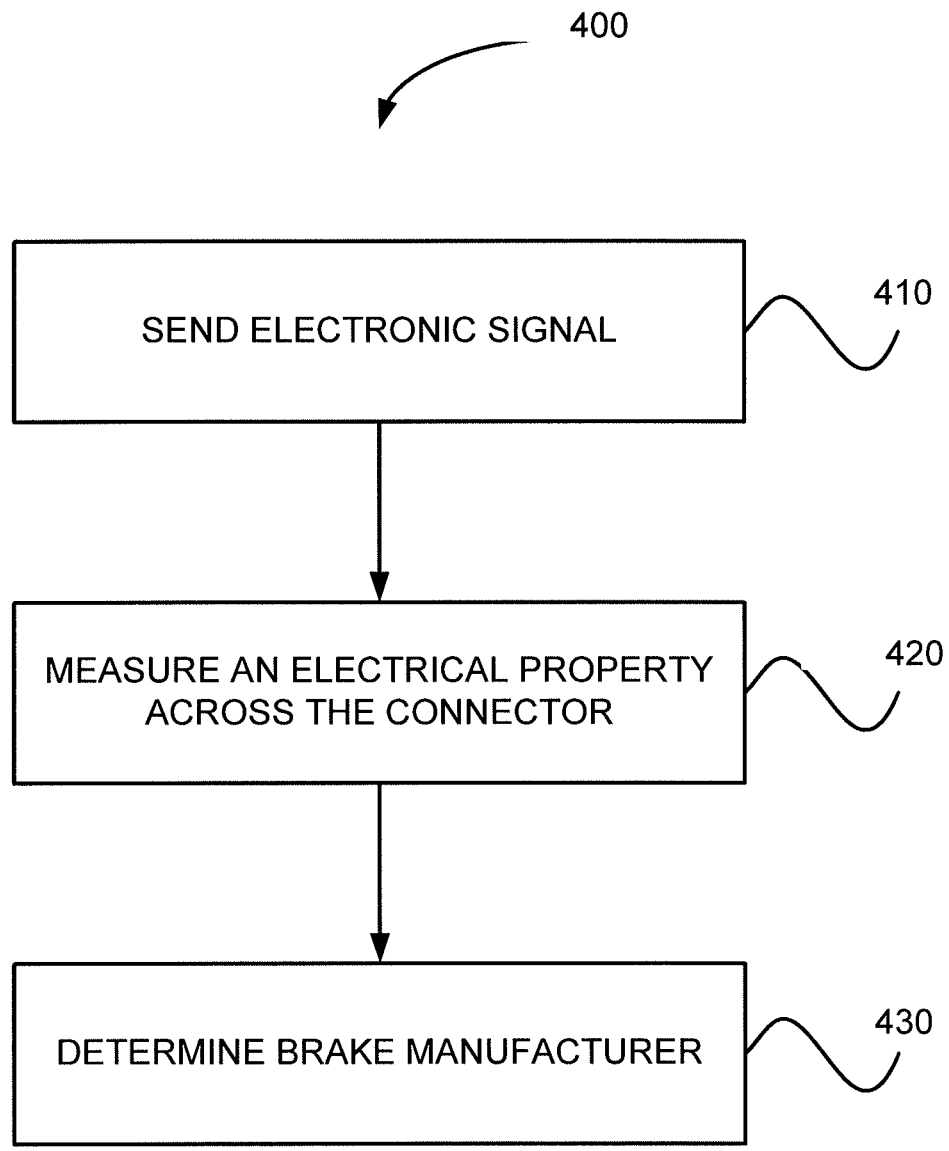
FIG. 4 illustrates a method for determining the brake manufacturer associated with a BTMS of a vehicle, in accordance with various embodiments.

Referring to FIG. 4, method 400 is disclosed for determining the brake manufacturer of a vehicle. An electronic signal such as voltage may be applied through the connector of a BTMS (step 410). In various embodiments, connectors can have a plurality of connector pins (e.g., pin A, pin B, and pin C) by which a voltage may be applied. Applying a voltage to a connector may comprise applying a voltage to one or more of the pins that comprise the connector. In that regard, the phrase "applying a voltage to a connector" may include applying a voltage to at least one pin of the connector but also applying a voltage to more than one pin of the connector, or may include leaving the pin in an open circuit. Accordingly, in various embodiments, where a ground, a power, and an open circuit are used, there can be $3^n$ possible states, where n is the number of pins (e.g., $3^0$, $3^1$, $3^2$, $3^3$, ... $3^n$).

Measuring an electrical property across the connector (step 420) may occur after voltage is applied in step 410. Measuring an electrical property may include measuring the drop in voltage across a pin of the connector. Measuring an electrical property may also include, in various embodiments, measuring impedance, current, or other electrical property across or associated with a pin, such as pin A. The measured drop in voltage may be referred to as an observed voltage.

Depending upon the material of a connector and what a connector is connected to, different electrical properties may be observed. In various embodiments, observed voltages may be obtained for one or more pins in a connector.

Thus, in various embodiments, by comparing the compositions of the various pins (e.g., pin A, pin B and pin C), brake manufacturer information, such as identity of the brake part number, manufacturer, and revision, can be determined (step 430). A lookup table or other data structure may store connector profiles associated with different brake manufacturer information, such as brake part numbers, identity of manufacturers, and revisions. The lookup table may be embodied in, for example, one of the BCUs 20a-20b. The lookup table may store combinations of expected voltage drops for connectors associated with different brake manufacturer information, such as brake part numbers, manufacturers, and revisions. A BCU may compare the observed voltages to the expected voltage found in the lookup table. A connector profile may thus take the form of, for example: Pin A (ALUMEL of type K thermocouple), Pin B (open circuit), Pin C (CHROMEL of type K thermocouple), and Pin D (ground). Thus, as Pin B and Pin D can have two states, there are a total of four possible states and, thus, four solutions. Where a match is found, it may be determined that the connector providing the observed voltages is associated with the brake manufacturer found in the lookup table.

In certain cases, a BTMS is installed with components downstream of a BCU. For example, a BTMS may be associated with EBAs. In that regard, the brake manufacturer may be inferred to be the brake manufacturer associated with components downstream of a BCU. For example, in step 430, if it is determined that Brake Manufacturer A is associated with a BTMS, it may be inferred that, for example, the EBAs and EMACs may also be associated with Brake Manufacturer A.

In various embodiments, the brake manufacturer determined in step 430 may be independent from the brake manufacturer of the BCU. In various embodiments, a BCU may not be compatible with downstream components from a different manufacturer. In such cases, the BCU may output to an output device a mismatch state. The mismatch state may be displayed on an output device or otherwise indicated on the output device. Further, the BCU may enter a fail safe mode in response to the mismatch state and may prevent an aircraft braking system from functioning.

Figure 5:
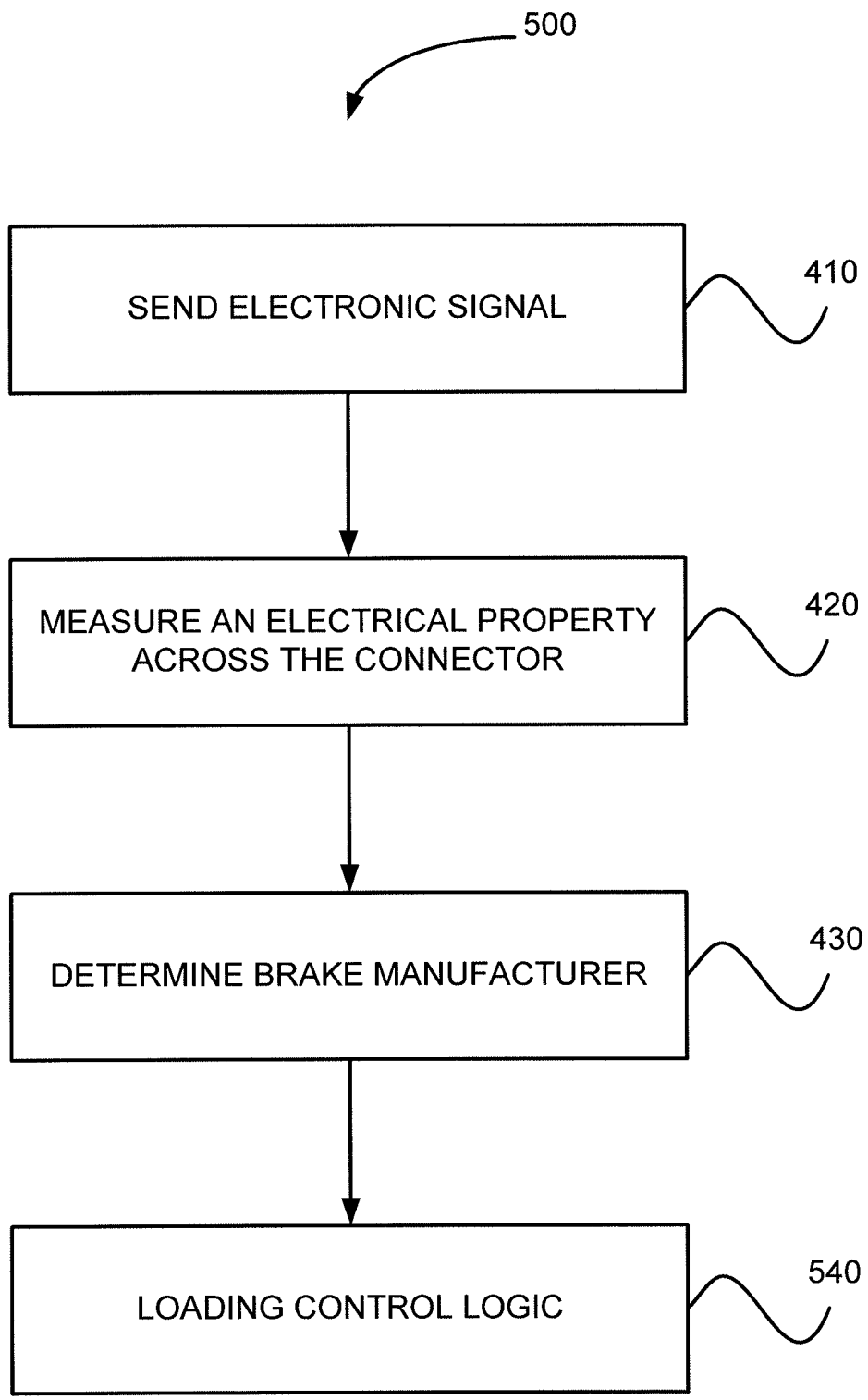
FIG. 5 illustrates a method for determining compatibility between a brake control unit and a BTMS, in accordance with various embodiments.

Referring to FIG. 5, a method for altering the logic of a BCU according to various embodiments is disclosed. In various embodiments, controller BCU may be configured to alter programming based on the manufacturer of downstream components. In various embodiments, a BCU may be selectively compatible with downstream components from a different manufacturer. In such cases, the BCU may output to an output device a mismatch state. The mismatch state may be displayed on an output device or otherwise indicated on the output device. A BCU may determine that it has stored in memory control logic that is operable with the downstream components. After performing the steps exemplified in FIG. 4, the BCU may load the control logic 540 and control the downstream components. In further embodiments, a BCU may apply a filter or other mapping to alter braking commands to be adapted to the detected downstream components.

For example, referring to FIG. 2, if the manufacturer for brake stack assembly 16 is different for wheels 12a and 12b, BCU 20a and/or 20b may alter the output command signal in the form of a brake control signal or multiple brake control signals in response to the input signal command. In various embodiments, the BCU may automatically alter the programming. In various embodiments, maintenance personnel can identify the correct brake assembly manufacturer and can load the correct brake tuning software on the BCU. Accordingly, in various embodiments, the brake stack assembly can exhibit the correct behavior (e.g., anti-skid behavior) because the brake control system's output can be adjusted in accordance with the manufacturer of the brake stack assembly.

In various embodiments, identification of different brake manufacturers associated with a BCU and downstream components may improve the safety and performance of an aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for determining manufacturers comprising:
 applying, by a brake control unit (BCU), a test voltage to a connector of a brake temperature monitoring system (BTMS),
 measuring, by the BCU, an observed voltage across the connector, and
 determining, by the BCU, an identity of a first brake manufacturer information associated with the BTMS based upon the observed voltage.

2. The method according to claim 1, further comprising retrieving, by the BCU, an identity of a second brake manufacturer information associated with the BCU.

3. The method according to claim 2, further comprising comparing, by the BCU, the identity of the first brake manufacturer information and the identity of the second brake manufacturer information.

4. The method according to claim 3, further comprising outputting, by the BCU and in response to the identity of the first brake manufacturer information and the identity of the second brake manufacturer information being equal, a match state.

5. The method according to claim 3, further comprising outputting, by the BCU and in response to the identity of the first brake manufacturer information and the identity of the second brake manufacturer information being different, a mismatch state.

6. The method according to claim 5, further comprising determining, by the BCU, whether the BCU is compatible with the identity of the first brake manufacturer information.

7. The method according to claim 6, further comprising loading, by the BCU and in response to determining that the BCU is compatible with the identity of the first brake manufacturer information, control logic configured in accordance with the identity of the first brake manufacturer information.

8. The method according to claim 7, further comprising preventing, in response to determining that the BCU is not compatible with the identity of the first brake manufacturer information, the BCU from functioning.

9. The method according to claim 1, wherein the determining comprises comparing the observed voltage to an expected voltage.

10. A system for determining manufacturers comprising
 a brake control unit (BCU) configured to be in electrical communication with a connector of a brake temperature monitoring system (BTMS),
 wherein the BCU is configured to apply a test voltage to the connector,
 wherein the BCU is configured to measure an observed voltage across the connector,
 wherein the BCU is configured to determine an identity of a first brake manufacturer information associated with the BTMS based upon the observed voltage.

11. The system according to claim 10, wherein the BCU is configured to retrieve an identity of a second brake manufacturer information associated with the BCU.

12. The system according to claim 11, wherein the BCU is configured to compare the identity of the first brake manufacturer information and the identity of the second brake manufacturer information.

13. The system according to claim 12, further comprising an output device configured to display a match state in response to the identity of the first brake manufacturer information and the identity of the second brake manufacturer information being equal.

14. The system according to claim 12, further comprising an output device configured to display a mismatch state in response to the identity of the first brake manufacturer information and the identity of the second brake manufacturer information being unequal.

15. The system according to claim 13, wherein the BCU is configured to load control logic configured in accordance with the identity of the first brake manufacturer information in response to determining that the BCU is compatible with the identity of the first brake manufacturer information.

\* \* \* \* \*